Dec. 13, 1932. C. J. W. CLASEN Re. 18,690
RAILWAY SIDE FRAME
Original Filed Oct. 28, 1919
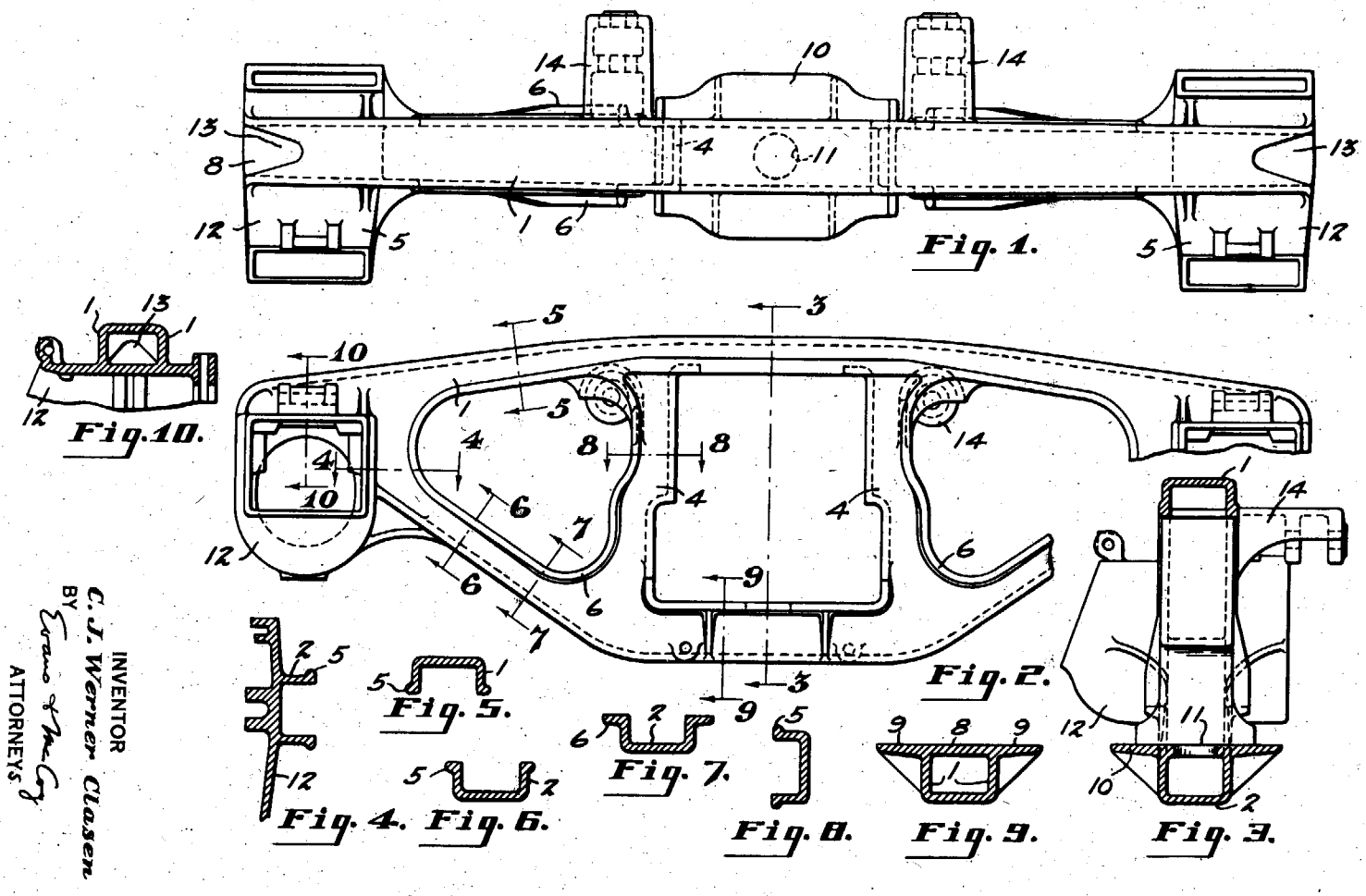
INVENTOR
C. J. Werner Clasen
BY Evans & McCoy
ATTORNEYS Reissued Dec. 13, 1932

Re. 18,690

UNITED STATES PATENT OFFICE

CLAUS J. WERNER CLASEN, OF DAVENPORT, IOWA, ASSIGNOR TO THE BETTENDORF COMPANY, OF BETTENDORF, IOWA, A CORPORATION OF IOWA

RAILWAY SIDE FRAME

Original No. 1,351,326, dated August 31, 1920, Serial No. 333,903, filed October 28, 1919. Application for reissue filed April 27, 1932. Serial No. 607,878.

My invention relates to side frames for car trucks and has as its principal object the provision of an improved side frame of the integral journal box type which shall possess the characteristics of increased strength and durability combined with economy of manufacture.

The novel features of my invention are pointed out with particularity in the appended claims. The invention itself, however, with further objects and advantages, will best be understood from the following description taken in connection with the accompanying drawing in which:

Figure 1 is a top plan view of a side frame according to my invention;

Fig. 2 is an elevational view of the side frame illustrated in Fig. 1, part being broken away;

Fig. 3 is a transverse sectional view of the frame shown in Figs. 1 and 2, taken on the line 3—3 of Fig. 1;

Fig. 4 is a section on the line 4—4 of Fig. 2;

Fig. 5 is a section on the line 5—5 of Fig. 2;

Fig. 6 is a section on the line 6—6 of Fig. 2;

Fig. 7 is a section on the line 7—7 of Fig. 2;

Fig. 8 is a section on the line 8—8 of Fig. 2;

Fig. 9 is a section on the line 9—9 of Fig. 2;

Fig. 10 is a section on the line 10—10 of Fig. 2.

The side frame illustrated in Figs. 1 to 10 inclusive comprises longitudinally extending top and bottom members or chords 1 and 2 respectively, and two columns or struts, such as 4, extending between members 1 and 2. The top member 1 is connected to the bottom member 2 at points near the ends of the frame. Struts 4 divide the space between members 1 and 2 into three apertures, the central one of which is roughly quadrilateral, and the other two of which are roughly triangular. The members 1 and 2 are channel shaped or U-shaped in cross section throughout most of their lengths, the central webs of these members being on top in the case of member 1 and at the bottom in the case of member 2. Struts 4 are integral with members 1 and 2 and are also channel-shaped or U-shaped in cross section, the central plates or web of these struts being on the sides toward the said central aperture.

I provide outwardly-extending beads, such as 5, around the edges of said triangular apertures, said beads being widened outwardly in sectors near the lower ends of struts 4 to form flanges such as 6. The outwardly-extending flanges 6 serve to reinforce the frame at the angles formed between struts 4 and chord 2.

Between the struts 4, the chord 2 has an upper central or horizontal web 8, and in this sector the chord 2 has also outstanding flanges, such as 9, at each side thereof in the same plane as web 8, forming therewith a spring seat 10 in which is an aperture 11 for interlocking the spring plank, not shown, with the side frame. It is evident that in the sector between the struts 4, except at aperture 11, chord 2 is of box section.

The top member 1 extends somewhat beyond the points of junction between itself and the bottom member 2, and in the angle thus formed I provide journal boxes, such as 12, which are integral with members 1 and 2, the central webs of chords 2 merging into the side walls of the boxes as illustrated in Fig. 4. The top member 1 extends across the tops of the journal boxes 12, the depending flanges of member 1 being integral with the tops of the boxes. Member 1 is preferably open at both ends as appears at 13 to permit the ready removal of cores.

The brake beam hanger brackets 14 are also preferably integral with the frame, extending rearwardly, at the upper angles of the said triangular apertures near the upper ends of struts 4.

While I have shown and described a side frame of specific outline, I do not wish to be limited to this.

It will be seen that a side frame according to my invention in which the chord and column members are of U-section and the chord members integral with the journal boxes is of great strength, especially when the upper chord member extends over the tops of the journal boxes, thus forming an integral box section therewith. It will be seen also that the projecting flanges 6 increase the strength of the entire frame without materially increasing its weight, while the box section at the spring seat also reinforces the entire structure.

Having thus described my invention, I claim:

1. An integral metallic car truck side frame of truss form comprising top and bottom chords of U section, spaced columns defining a central bolster receiving opening, and journal boxes having their top, bottom and side walls integrally formed, said top chord having spaced side flanges extending downwardly from its web, said journal boxes being disposed beneath the ends of the top chord and having their top walls beneath the web and integral with the overlying spaced depending flanges of the top chord to form, with the side flanges and web of the top chord, a rigid boxlike structure extending substantially the full width of each journal box, said bottom chord having end portions inclined upwardly toward the top chord and integrally joined to the side flanges of the top chord adjacent the top inner corners of the journal boxes, the side flanges and web of the bottom chord merging into the inner side walls of the journal boxes at and below the upper inner corner thereof, whereby the integrally formed journal boxes are positioned in the angles between the ends of the top and bottom chords and the entire structure of each journal box lends a resistance to the tensional forces acting upon the bottom chord.

2. An integral metallic car truck side frame of truss form comprising top and bottom chords of U section, spaced columns defining a central bolster receiving opening, and journal boxes having their top, bottom and side walls integrally formed, said top chord having spaced side flanges extending downwardly from its web, said journal boxes being disposed beneath the ends of the top chord and having their top walls beneath the web and integral with the overlying spaced depending flanges of the top chord to form, with the side flanges and web of the top chord, a rigid boxlike structure extending substantially the full width of each journal box, said bottom chord having end portions inclined upwardly toward the top chord and having its spaced side flanges merging into the side flanges of the top chord inwardly of the journal boxes and its spaced side flanges and web merging into the inner side walls of the journal boxes at and below the upper corners thereof, whereby the integrally formed journal boxes are positioned in the angles between the ends of the top and bottom chords and the entire structure of each journal box lends a resistance to the tensional forces acting upon the bottom chord.

In testimony whereof I affix my signature.

CLAUS J. WERNER CLASEN.